Jan. 25, 1927.

C. F. HETHERINGTON 1,615,273

FLUID PRESSURE OPERATED GATE

Filed August 3, 1926   2 Sheets-Sheet 1

INVENTOR.
Carl F. Hetherington,

BY

Hood + Hahn.
ATTORNEYS

Jan. 25, 1927.  
C. F. HETHERINGTON  
1,615,273  
FLUID PRESSURE OPERATED GATE  
Filed August 3, 1926   2 Sheets-Sheet 2

INVENTOR.  
Carl F. Hetherington,  
BY  
Hood & Hahn.  
ATTORNEYS

Patented Jan. 25, 1927.

1,615,273

UNITED STATES PATENT OFFICE.

CARL F. HETHERINGTON, OF INDIANAPOLIS, INDIANA.

FLUID-PRESSURE-OPERATED GATE.

Application filed August 3, 1926. Serial No. 126,838.

The object of my invention is to produce a liquid pressure operated gate for pug mills, the construction being such that the gate may, when necessary, be steam heated.

Figure 1:
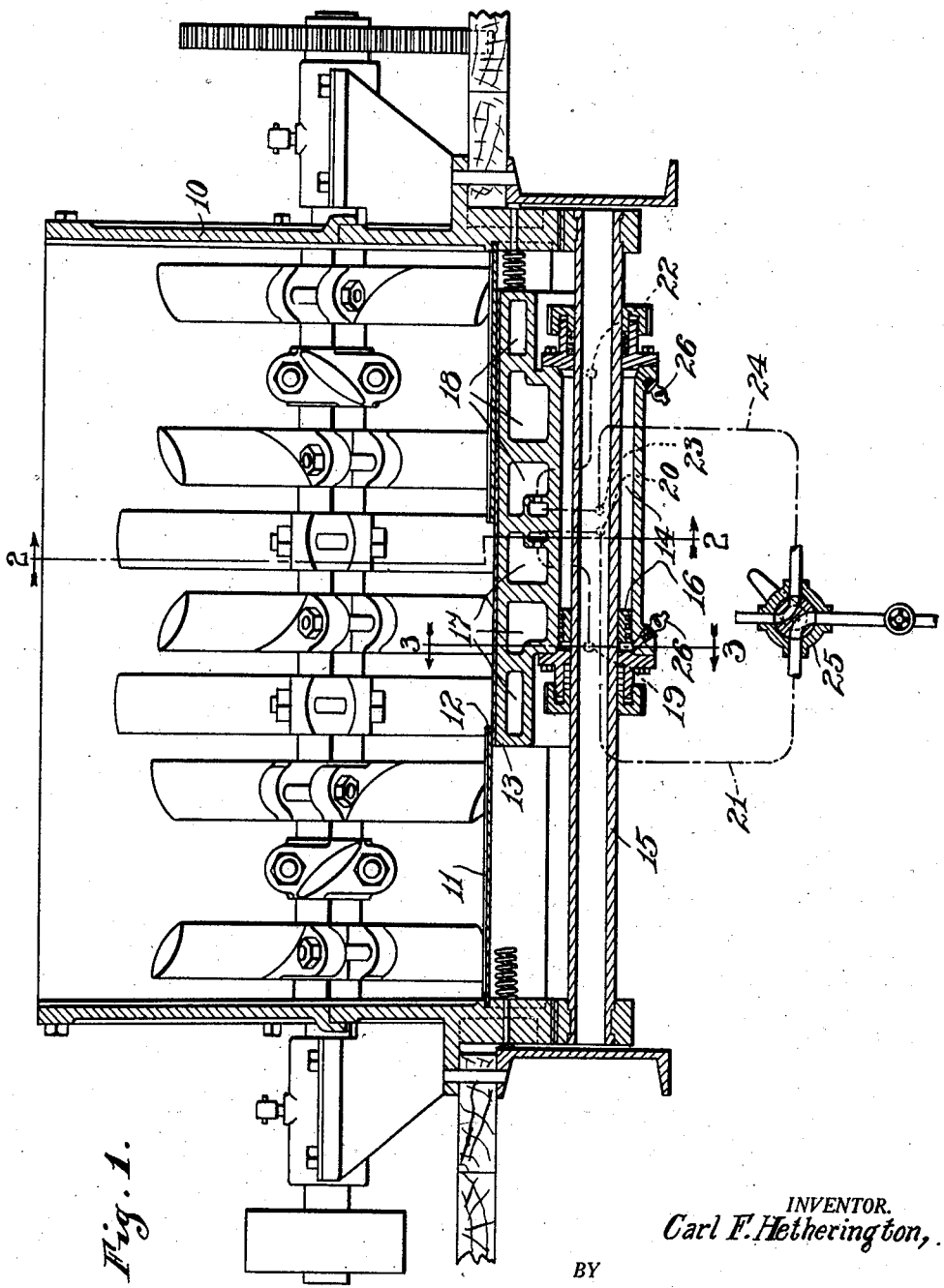
Figure 2:
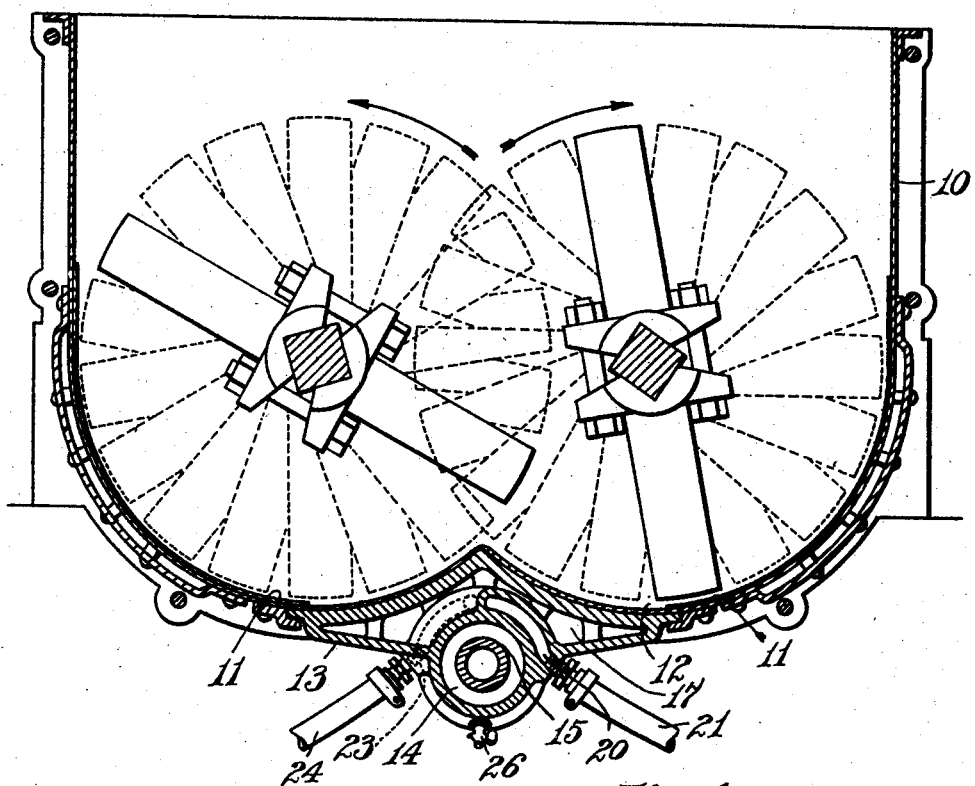
Figure 4:
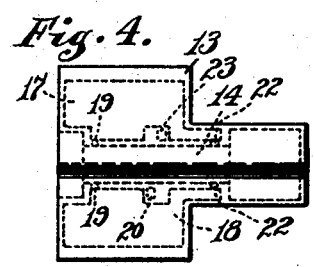
Figure 3:
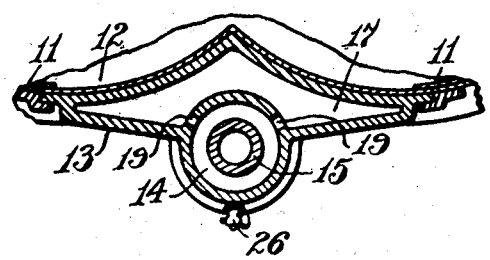

The accompanying drawings illustrate my invention:

Fig. 1 is a longitudinal section of an embodiment of my invention; Fig. 2 is a transverse section on line 2—2 of Fig. 1; Fig. 3 a transverse section on line 3—3 of Fig. 1; and Fig. 4 a plan of the gate.

In the drawings 10 indicates the main body or shell of the mill having a bottom formed by two adjacent semi-cylindrical portions 11 on each of which is a discharge opening 12.

Opening 12 is closed by a sliding gate 13 which fits the adjacent under-surfaces of the bottom portions 11.

Gate 12 is provided, in its lower part, with a cylinder 14 and is slidably supported in position by a fixed piston rod 15 having a piston 16 fitting cylinder 14.

Formed on gate 13, between cylinder 14 and its upper face, are two chambers 17 and 18. Chamber 17 is ported, at 19, 19, into one end of cylinder 14, and at 20 is ported to a supply hose, or other flexible supply connection 21.

Chamber 18 is similarly ported at 22 to the opposite end of cylinder 14, and at 23 is ported to a flexible supply connection 24.

In operation chambers 17 and 18 may be filled with a liquid, such as oil, or water, and connectons 21 and 24 connected through a 4-way valve 25 of usual construction to a source of pressure, whereupon the gate may be shifted by liquid pressure.

The apparatus in this condition will be fit for use in mixing cold mixtures, such for instance as cold paving mixtures. If it is desired to handle materials which need to be kept heated, the liquid in the two chambers 17 and 18 may be entirely drained out through pet cocks 26, in which case steam pressure may be applied directly to the piston, or the liquid may be partially drained out, preferably to a point just below ports 20 and 23, and steam pressure applied indirectly to the piston through the liquid in chambers 17 and 18 and cylinder 14, the steam serving to keep the upper surface of the gate warm enough to prevent sticking.

In order to prevent a jerky operation of the gate oil may be substituted for water, on cylinder 14 and chambers 17 and 18 up to the level of ports 20 and 23. Condensation of the steam may be compensated by setting the pet cocks 26 open just enough to permit drainage of the accumulating water preventing outflow of oil.

It will be noted that when the water level is maintained below ports 20 and 23, any additional condensation will be blown out by the steam in the chambers when the connection 21 or 24 is ported to atmosphere through the 4-way valve.

It will be noted that the construction disclosed may be used with any fluid pressure as a motive power; compressed air, or steam, or water pressure, or oil pressure, or any combination thereof, thus adapting the structure to universal use in connection with all sorts of materials which need to be mixed either cold or hot.

I claim as my invention:

1. A mixer gate comprising a cylinder, a piston rod and piston mounted on the said cylinder, a liquid-retaining chamber formed in the gate between its upper surface and the cylinder and ported into one end of the cylinder, a pressure supply port leading into said chamber, and in independent supply pressure passage leading into the opposite end of said cylinder.

2. A mixer gate comprising a cylinder, a piston rod and piston mounted on the said cylinder, a liquid-retaining chamber formed in the gate between its upper surface and the cylinder and ported into one end of the cylinder, a pressure supply port leading into said chamber at a point above the cylinder, and an independent supply pressure passage leading into the opposite end of said cylinder.

3. A mixer gate comprising a cylinder, a piston rod and piston mounted on the said cylinder, two independent liquid-retaining chambers formed in the gate between the upper surface thereof and the cylinder, one of said chambers being ported into one end of the cylinder and the other chamber being ported into the opposite end of the cylinder and supply-pressure passages, one leading into each of said chambers.

4. A mixer gate comprising a cylinder, a piston rod and piston mounted on the said cylinder, two independent liquid-retaining chambers formed in the gate between the upper surface thereof and the cylinder, one of said chambers being ported into one end of the cylinder and the other chamber being ported into the opposite end of the cylinder and supply-pressure passages, one leading into each of said chambers at points above the ports leading into the cylinder.

In witness whereof, I have hereunto set my hand at Indianapolis, Indiana, this 29th day of July, A. D. one thousand nine hundred and twenty six.

CARL F. HETHERINGTON.